United States Patent
Pulleyn et al.

(10) Patent No.: US 7,627,746 B1
(45) Date of Patent: Dec. 1, 2009

(54) NETWORK APPLIANCE MANAGEMENT

(75) Inventors: Ivan W. Pulleyn, Sunnyvale, CA (US); Stuart M. Bailey, Mountain View, CA (US); Lester Igo, Palo Alto, CA (US); Srinath Gutti, San Jose, CA (US)

(73) Assignee: Infoblox Inc., Santa Clara, CA (US)

( * ) Notice: Subject to any disclaimer, the term of this patent is extended or adjusted under 35 U.S.C. 154(b) by 380 days.

(21) Appl. No.: 11/200,646

(22) Filed: Aug. 10, 2005

(51) Int. Cl.
*G06F 9/00* (2006.01)

(52) U.S. Cl. .......................... 713/100; 713/1; 717/168; 717/170

(58) Field of Classification Search ............ 713/1, 713/2, 100; 717/168, 170
See application file for complete search history.

(56) References Cited

U.S. PATENT DOCUMENTS

| | | | |
|---|---|---|---|
| 5,623,604 A * | 4/1997 | Russell et al. ........... | 717/167 |
| 6,622,246 B1 * | 9/2003 | Biondi ..................... | 713/100 |
| 6,996,818 B2 * | 2/2006 | Jacobi et al. ............. | 717/170 |
| 2004/0024917 A1 * | 2/2004 | Kennedy et al. ......... | 710/1 |
| 2004/0103172 A1 * | 5/2004 | Chen et al. .............. | 709/221 |
| 2005/0114853 A1 * | 5/2005 | Glider et al. ............. | 717/170 |
| 2005/0125575 A1 * | 6/2005 | Alappat et al. ........... | 710/41 |
| 2006/0265696 A1 * | 11/2006 | Mayfield et al. ......... | 717/137 |

* cited by examiner

*Primary Examiner*—Mark Connolly
*Assistant Examiner*—Paul B Yanchus, III
(74) *Attorney, Agent, or Firm*—Van Pelt, Yi & James LLP

(57) ABSTRACT

Installing software on a network appliance having a short term memory and a hard disk is disclosed. Installing includes receiving an image of the software, loading the image into a short term memory on the network appliance, and writing the image to a hard disk on the network appliance. Updating software and data on a network appliance having a hard disk is disclosed. Updating includes writing a new version of software to an inactive software partition of the hard disk, writing an old version of data to an inactive data partition of the hard disk, activating the inactive software partition, and migrating the old version of data to a new version of data.

26 Claims, 8 Drawing Sheets

NETWORK APPLIANCE MANAGEMENT

BACKGROUND OF THE INVENTION

Computer networks utilize network equipment, such as servers or appliances, to provide network services such as Lightweight Directory Access Protocol (LDAP), Dynamic Host Configuration Protocol (DHCP), Domain Name System (DNS), and Remote Authentication Dial In User Service (RADIUS). Installation and updates of network appliance software are typically performed manually on each network device. Software installation could include creating an Operating System (OS) distribution, initializing a hard disk, and duplicating the disk, which can be time consuming. Updating the software and data in a network appliance typically involves service downtime. An improved method of managing network appliance software is needed.

BRIEF DESCRIPTION OF THE DRAWINGS

Various embodiments of the invention are disclosed in the following detailed description and the accompanying drawings.

DETAILED DESCRIPTION

The invention can be implemented in numerous ways, including as a process, an apparatus, a system, a composition of matter, a computer readable medium such as a computer readable storage medium or a computer network wherein program instructions are sent over optical or electronic communication links. In this specification, these implementations, or any other form that the invention may take, may be referred to as techniques. In general, the order of the steps of disclosed processes may be altered within the scope of the invention.

A detailed description of one or more embodiments of the invention is provided below along with accompanying figures that illustrate the principles of the invention. The invention is described in connection with such embodiments, but the invention is not limited to any embodiment. The scope of the invention is limited only by the claims and the invention encompasses numerous alternatives, modifications and equivalents. Numerous specific details are set forth in the following description in order to provide a thorough understanding of the invention. These details are provided for the purpose of example and the invention may be practiced according to the claims without some or all of these specific details. For the purpose of clarity, technical material that is known in the technical fields related to the invention has not been described in detail so that the invention is not unnecessarily obscured.

Figure 1A:
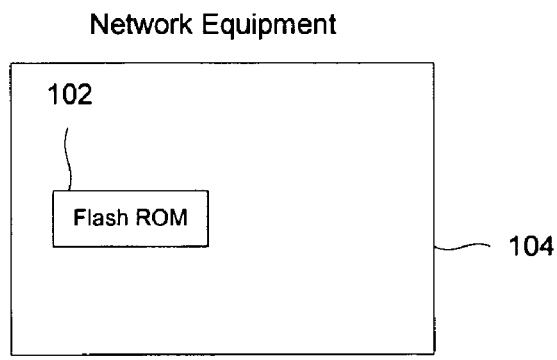
FIG. 1A is a block diagram illustrating a network device with a Flash ROM.

FIG. 1A is a block diagram illustrating a network device with a Flash ROM. In this example, network device 104 is shown to include Flash ROM 102. Network device 104 does not necessarily include a hard disk. Flash ROM 102 includes code for network (remote or diskless) booting using the Preboot Execution Environment (PXE) protocol. The PXE protocol allows networked computers without an operating system or hard disk to be booted remotely.

Figure 1B:
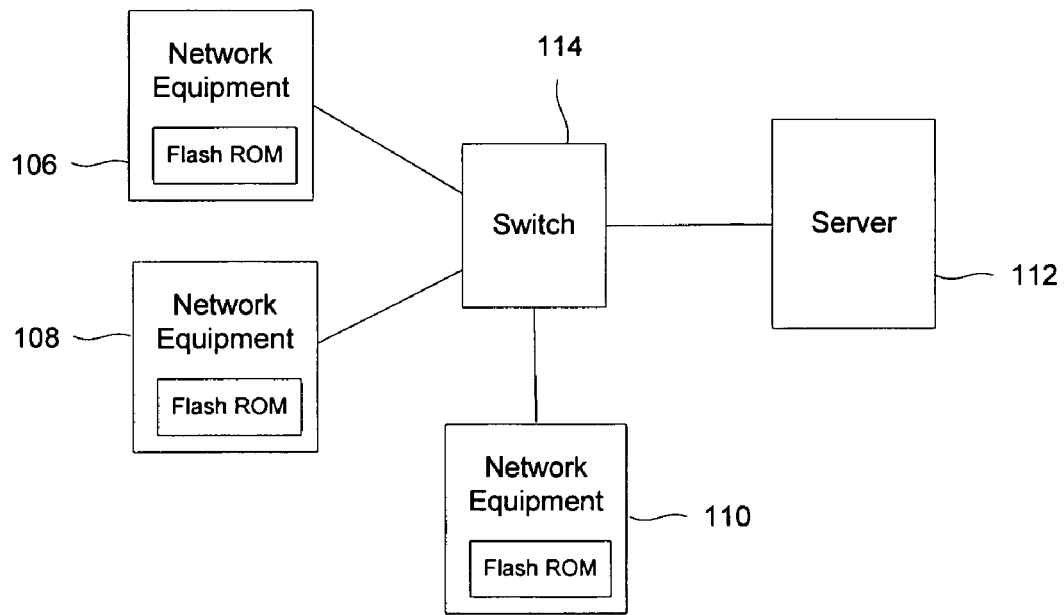
FIG. 1B is a block diagram illustrating network devices that use the PXE protocol for network booting.

FIG. 1B is a block diagram illustrating network devices that use the PXE protocol for network booting. Network equipment devices 106-110 are connected to server 112 through switch 114. In some embodiments, each of network devices 106-110 is similar to network device 104. Each of devices 106-110 contains PXE code on a Flash ROM chip that allows it to communicate with server 112 so that it can be remotely booted. Server 112 is a PXE server that contains an operating system available for booting devices 106-110.

Figure 2A:
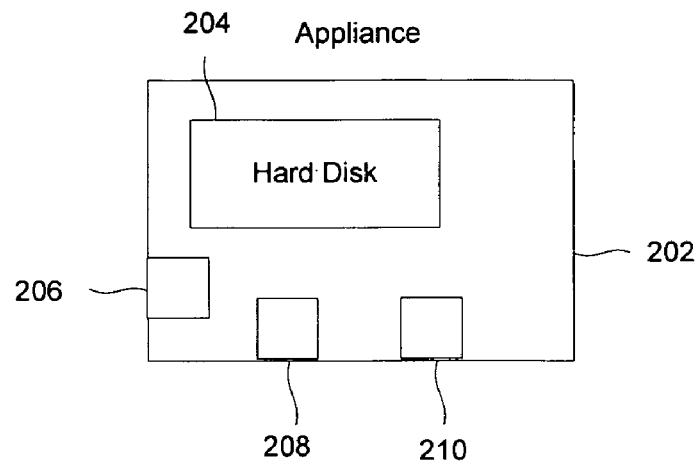
FIG. 2A is a block diagram illustrating a network appliance with a hard drive.

FIG. 2A is a block diagram illustrating a network appliance with a hard drive. A network appliance is a special purpose device for serving one or more network protocols. For example, the appliance can be optimized to provide one or more network services. The appliance may be configured to provide DNS and/or DHCP service, for example. Various functions could be enabled and/or disabled on the network appliance to optimize DNS and/or DHCP service. The network appliance does not need to be actively managed. The appliance may or may not include a hard disk.

In this example, network appliance 202 is shown to include hard disk 204 and network ports 206-210. Any number of network ports may be included. In this example, network port 206 is used for data communication, network port 208 is used for communicating with a high availability (HA) peer, and network port 210 is used for management. The HA peer could be another appliance that serves as a backup to appliance 202. In some embodiments, the HA peer is similar to appliance 202. Hard disk 204 includes the software distribution for the network appliance, which includes operating system, platform, and application code. For example, application code could include code specific to a particular network service, such as DNS, RADIUS, or LDAP. Platform code could include code common to more than one network service. Hard disk 204 could be any size. For example, hard disk 204 could be 2 GB in size. In some embodiments, hard disk 204 includes space for a database. Appliance 202 further includes PXE code in ROM. The PXE code in this case is not necessarily used for network booting. The PXE code may be used to download the software distribution from a server during installation, as more fully described below. PXE or any other suitable code may be used. For example, Bootstrap Protocol (BOOTP) code may also be used.

Figure 2B:
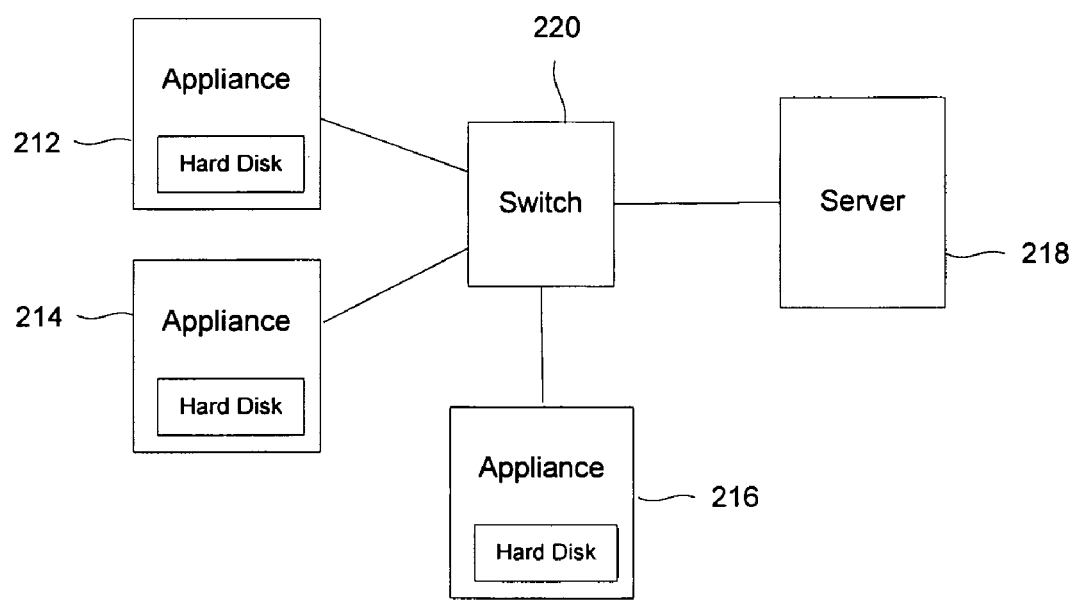
FIG. 2B is a block diagram illustrating network appliances that use the PXE protocol for software installation.

FIG. 2B is a block diagram illustrating network appliances that use the PXE protocol for software installation. In some embodiments, network appliances 212-216 are new appliances that are located at a manufacturer site. Network appliances 212-216 are connected to server 218 through switch 220. In some embodiments, each of network appliances 212-216 is similar to appliance 202. Any of appliances 212-216 could be connected to an HA peer (not shown). Each of appliances 212-216 contains PXE code on a hard disk that allows it to download a software distribution from server 218. Server 112 is a PXE server that contains distribution software for appliances 106-110. In this example, the network appliance uses PXE to download the operating system code to its own disk and then boots from its own disk.

Figure 2C:
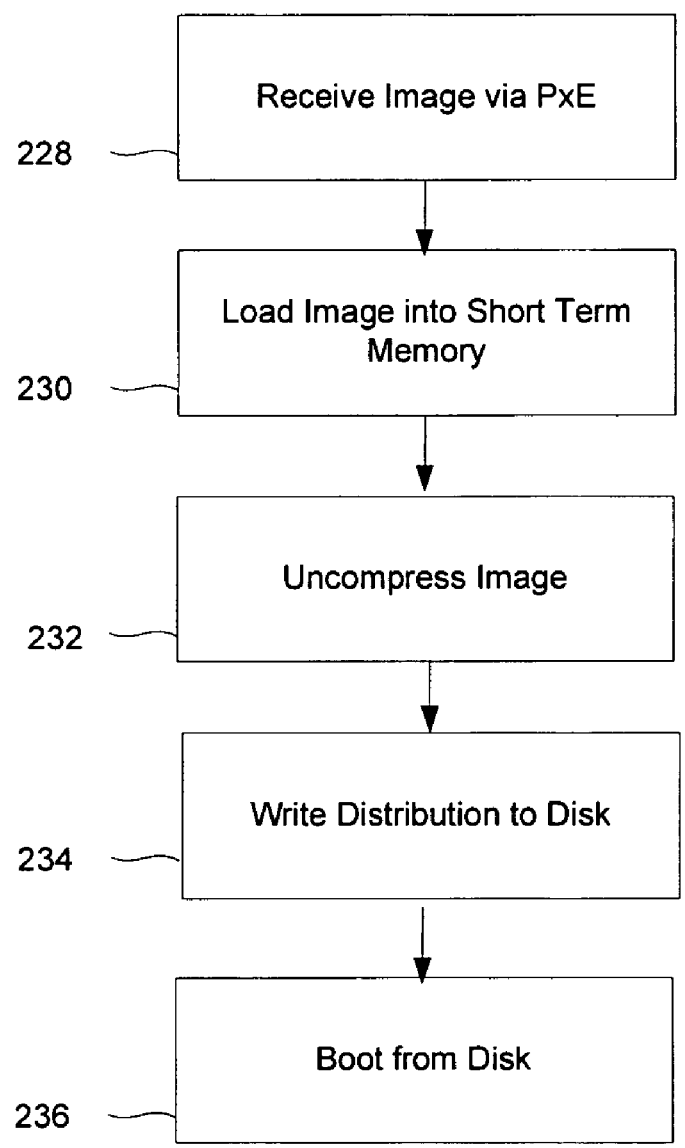
FIG. 2C is a flowchart illustrating a process of installing software on a network appliance.

FIG. 2C is a flowchart illustrating a process of installing software on a network appliance. In some embodiments, this process is performed by one of network appliances 212-216. In this example, an image is received (228). For example, the image could be received via the PXE protocol, BOOTP, or another appropriate protocol. The image could include a software distribution or a portion of a software distribution. For example, the image could include an operating system. The image could be any size. In some embodiments, the image is 250 to 400 MB in size. In some embodiments, the application code is 50 to 75 MB in size. In some embodiments, the image is received at one of network appliances 212-216 from server 218. The image is loaded into short term memory (230). For example, the image could be loaded into RAM. The image is uncompressed (232). In some embodiments, the received image is not compressed and (232) is not needed. The distribution is written to the hard disk (234). The appliance is booted from the hard disk (236).

All appliances can be installed from the same image over the network. The installation can be performed on any appliance on the network and on more than one appliance at the same time. As such, new appliances can be automatically provisioned in the field. Similarly, software on existing appliances can be automatically updated in the field.

Figure 3A:
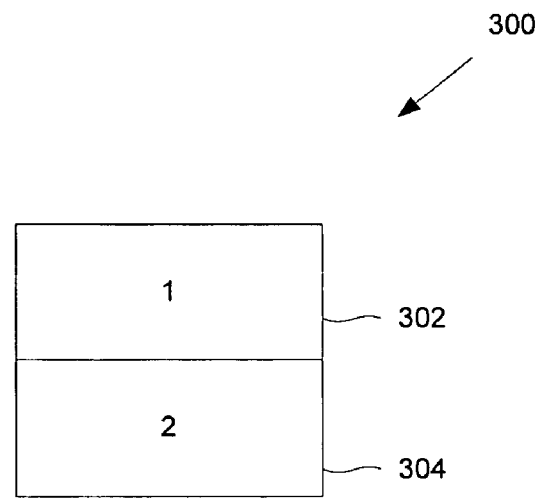
FIG. 3A is a diagram of a partitioned hard disk.

FIG. 3A is a diagram of a partitioned hard disk. Hard disk 300 is an example of a hard disk in a network appliance, such as network appliance 202 or 212-216. In this example, hard disk 300 is partitioned into two partitions: partition 302 and partition 304. In some embodiments, partition 302 is used to store software and partition 304 is used to store data. For example, hard disk 300 may be used in an appliance that utilizes a database. Partitions 302 and 304 are not necessarily the same size.

Figure 3B:
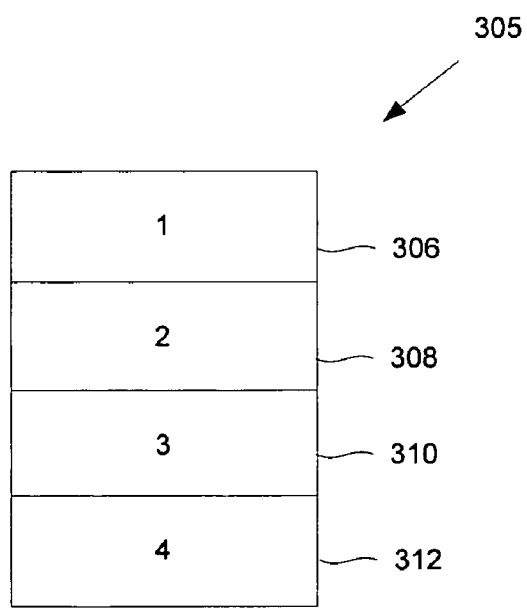
FIG. 3B is a diagram of a partitioned hard disk.

FIG. 3B is a diagram of a partitioned hard disk. Hard disk 305 is an example of a hard disk in a network appliance, such as network appliance 202 or 212-216. In this example, hard disk 305 is partitioned into four partitions: partition 306, 308, 310, and 312. In some embodiments, partition 306 is used to store software and partition 308 is used to store data. For example, hard disk 305 may be used in an appliance that utilizes a database. Partitions 306-312 are not necessarily the same size. In some embodiments, partitions 306 and 308 are active partitions and partitions 310 and 312 are inactive partitions. In other words, the network device on which the hard disk is located is running on partitions 306 and 308. Partitions 310 and 312 may serve as backup partitions, and/or may be used to perform updates, as more fully described below.

Figure 3C:
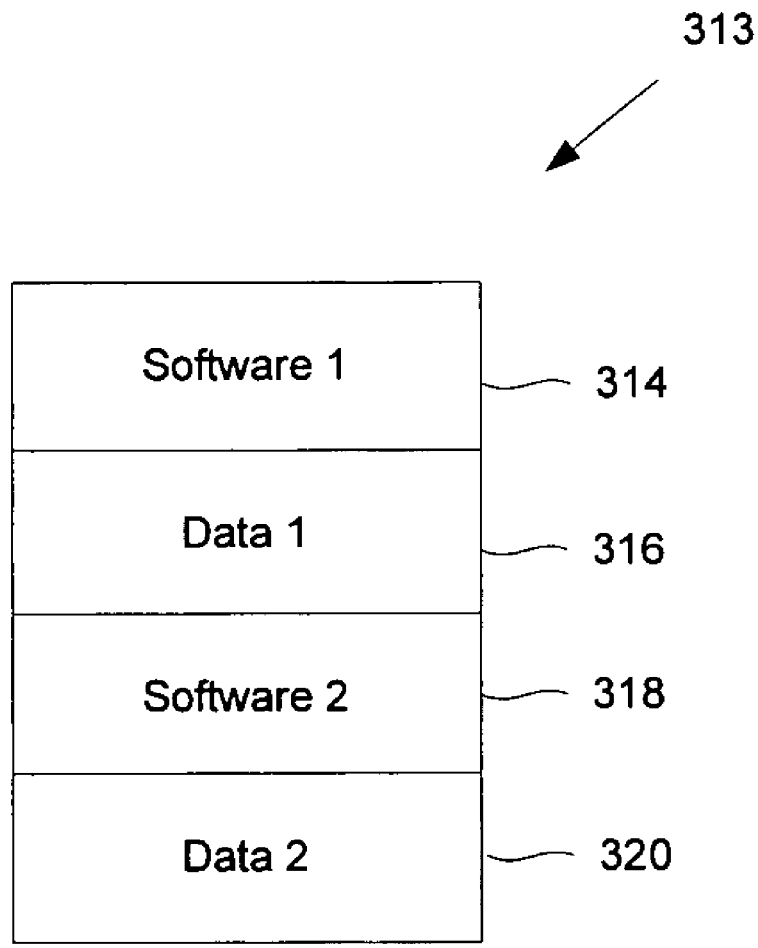
FIG. 3C is a diagram of a partitioned hard disk.

FIG. 3C is a diagram of a partitioned hard disk. Hard disk 313 is an example of a hard disk in a network appliance, such as network appliance 202 or 212-216. In this example, hard disk 313 is partitioned into four partitions: partition 314, 316, 318, and 320. In some embodiments, partition 314 is used to store software and partition 316 is used to store data. For example, hard disk 313 may be used in an appliance that utilizes a database. Partitions 314-320 are not necessarily the same size. In this example, partitions 314 and 316 are active partitions and partitions 318 and 320 are inactive partitions. In other words, the network device on which the hard disk is located is running on partitions 306 and 308. Partitions 310 and 312 are used to perform updates, as more fully described below.

Figure 4:
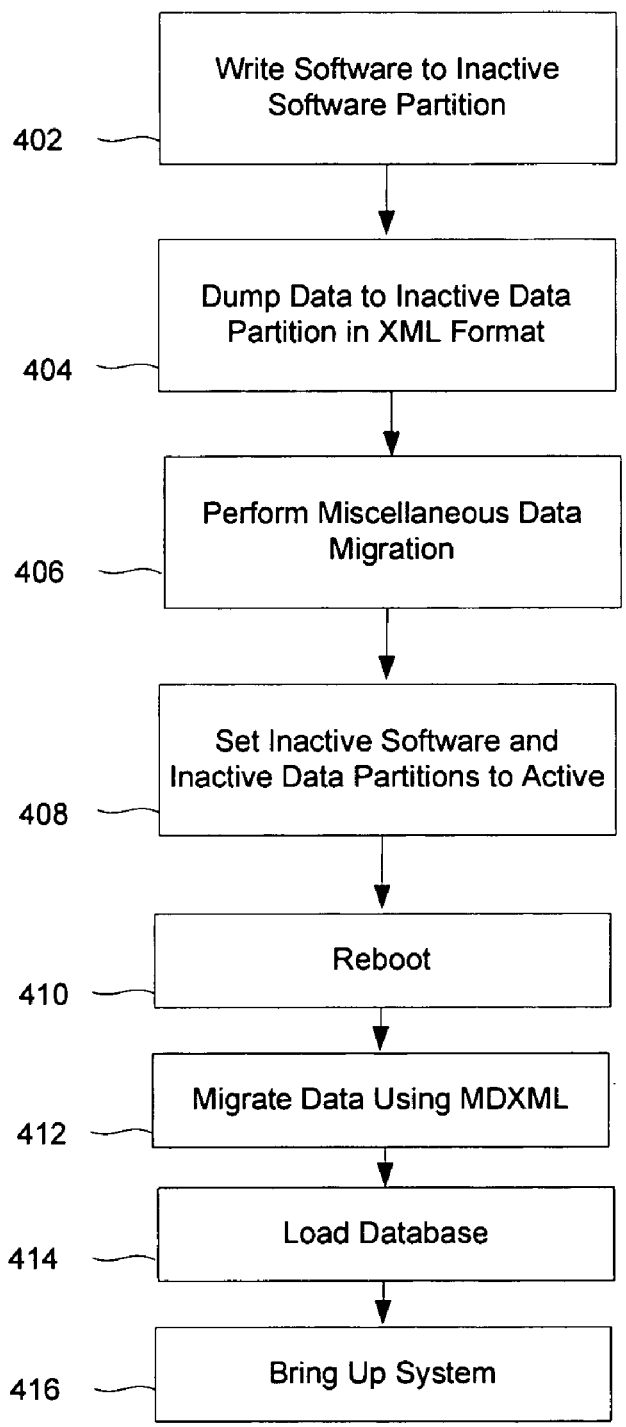
FIG. 4 is a flowchart illustrating a process of updating software on a network appliance.

FIG. 4 is a flowchart illustrating a process of updating software on a network appliance. In some embodiments, this process is performed on a network appliance such as network appliance 202 or 212-216. In this example, the network appliance includes a hard disk having active and inactive software and data partitions, such as hard disk 313. Updated software is written to the inactive software partition of a hard disk (402). For example, updated software is written to partition 318 of hard disk 313. The updated software may include the entire software distribution or a portion of the software distribution. For example, the updated software may comprise new application code. The data is dumped to the inactive data partition (404). For example, the data is written to partition 320 of hard disk 313. In some embodiments, the data is stored in the inactive data partition in a binary format. The binary data may be exported into a generalized markup language, such as XML. Miscellaneous data migration is performed (406). For example, a certificate and/or license may be migrated. The inactive software partition and inactive data partition are set to active (408). Setting these partitions to active causes them to become active partitions if the hard disk is rebooted. For example, a boot block is reconfigured to point to the inactive software partition. The hard disk is rebooted (410). The data is migrated (412). For example, when the hard disk comes up, the data is migrated to an updated version of data compatible with the updated software. In some embodiments, the updated software performs the data migration. In some embodiments, the data is migrated using a markup language-based specification of a data migration. For example, the data migration may be described in an XML-based language. The updated database is loaded (414). The system is brought up (416).

In some embodiments, the updated software is signed (e.g., using a certificate), encrypted, and/or compressed. The updated software is downloaded to a temporary location in the active software partition and then validated, decrypted, and/or decompressed into the inactive software partition.

Because the previous version of software and data are stored in the now inactive partitions (e.g., partitions 314 and 316), the network appliance can revert to running the previous version of software in a similar manner.

Figure 5:
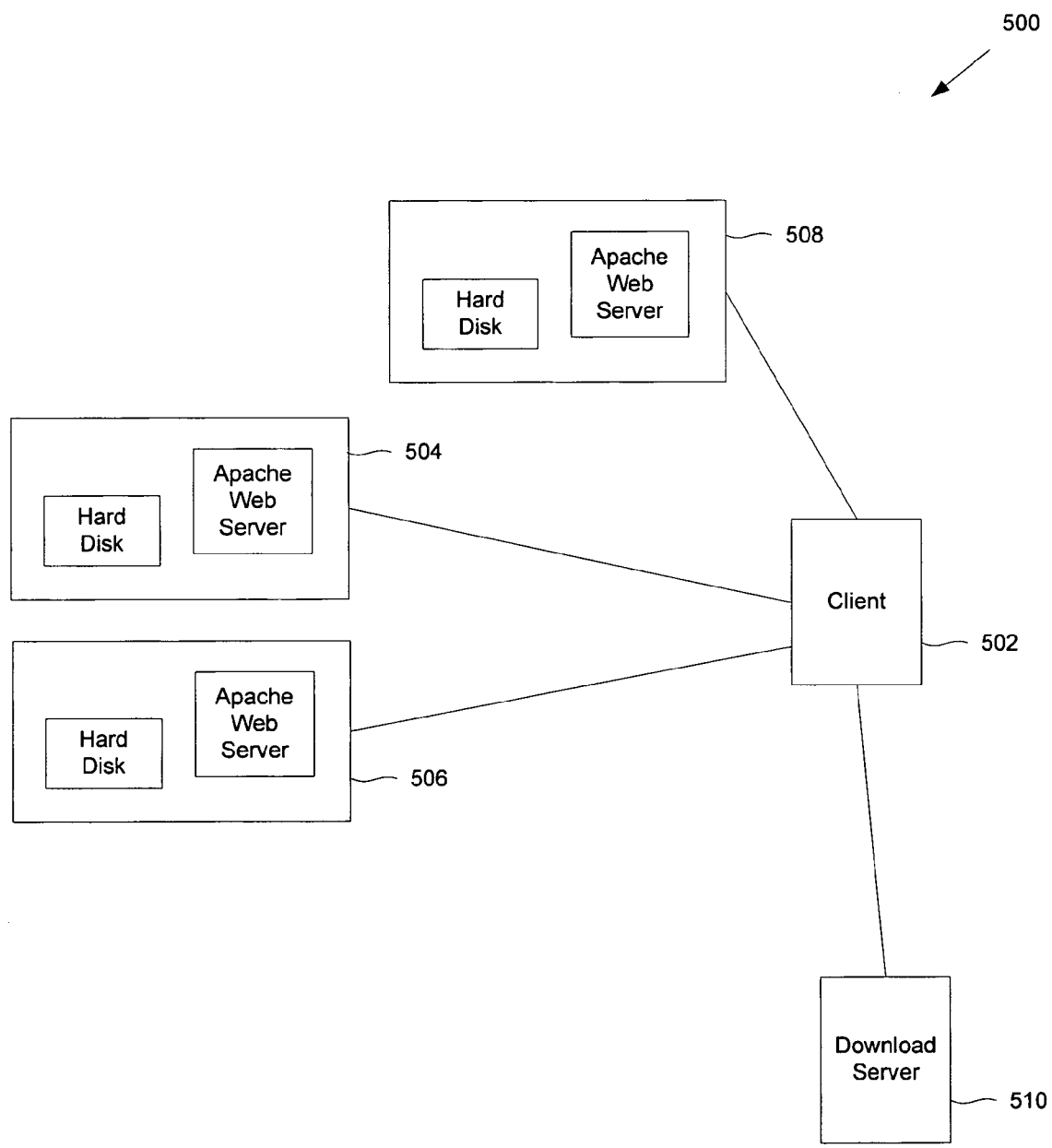
FIG. 5 is a block diagram of a system in which an update is performed on a network appliance.

FIG. 5 is a block diagram of a system in which an update is performed on a network appliance. System 500 is shown to include three network appliances 504-508, a client 502, and a download server 510. For example, network appliances 504-508 and client 502 may be located at one or more customer sites. Download server 510 may be located at a provider site. Client 502 runs a browser or other interface to server 510. Download server 510 includes one or more versions of software for appliances 504-510. Network appliances 504-508 each may be any type of network appliance. In this example, network appliances 504-508 serve as Apache web servers. In some embodiments, network appliances 504-508 do not all provide the same network service. For example, each of appliances 504-508 could provide a different network service(s). Each of network appliances 504-508 has a hard disk. In some embodiments, each hard disk has active and inactive software and data partitions, such as hard disk 313.

Figure 6:
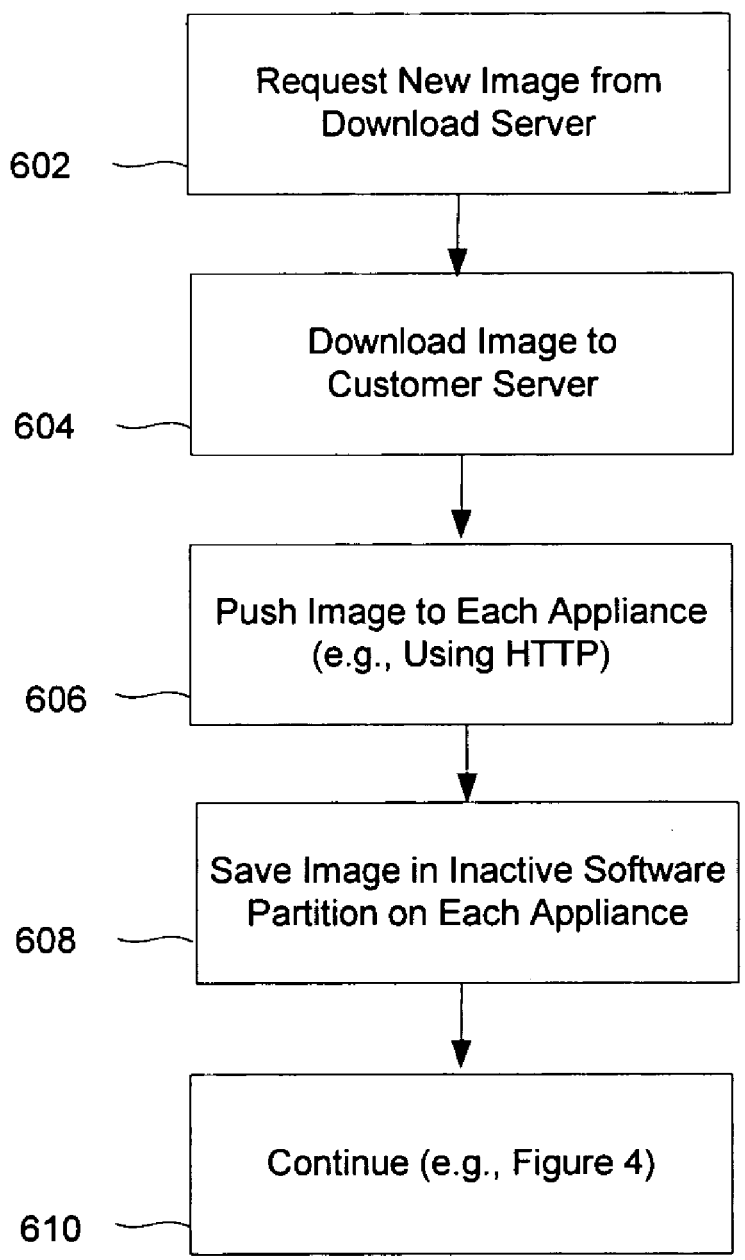
FIG. 6 is a flowchart illustrating a process of updating software in a network appliance.

FIG. 6 is a flowchart illustrating a process of updating software in a network appliance. In some embodiments, this process is performed within system 500. In this example, a new image is requested from a download server (602). For example, an administrator at client 502 requests a new software image from download server 510. In some embodiments, the request is made using a web-based interface. In some embodiments, the request is authorized. The image is downloaded to the client (604). For example, the image is downloaded from download server 510 to client 502 using FTP or HTTP. Alternatively, the image may be obtained from a CD-ROM. In some embodiments, the image is encrypted and/or compressed. The image is pushed to each appliance (606). For example, the image is sent from client 502 to each appliance 504-508 using HTTP. On each appliance, the image is saved in the inactive software partition (608). In some embodiments, the image is verified and/or uncompressed. The update process continues on each appliance (610). For example, the process of FIG. 4 is performed on each appliance. In some embodiments, not all of network appliances 504-508 are updated. In some embodiments, one or more of network appliances 504-508 receive different versions or types of software.

Although the foregoing embodiments have been described in some detail for purposes of clarity of understanding, the invention is not limited to the details provided. There are many alternative ways of implementing the invention. The disclosed embodiments are illustrative and not restrictive.

What is claimed is:

1. A method of installing software on a network appliance having a short term memory and a hard disk, comprising:
    receiving an image of the software;
    loading the image into a short term memory on the network appliance;
    writing the image to a hard disk on the network appliance, wherein the network appliance is associated with a networking protocol, including one or more of: Lightweight Directory Access Protocol (LDAP), Dynamic Host Configuration Protocol (DHCP), Domain Name System (DNS), and Remote Authentication Dial In User Service (RADIUS);
    accessing a hard disk having an inactive software partition an active software partition, an inactive data partition, and an active data partition;
    writing a new version of software to the inactive software partition of the hard disk;
    writing an old version of data to the inactive data partition of the hard disk;
    activating the inactive software partition and the inactive data partition; and
    migrating the old version of data to a new version of data, wherein the new version of software performs the migration;
    wherein the image is received using software that is configured to allow a networked computer without an operating system or a hard disk to be booted remotely over a network.

2. A method as recited in claim 1, wherein the network appliance is configured to have a management connection and a service connection.

3. A method as recited in claim 1, wherein the short term memory is RAM.

4. A method as recited in claim 1, wherein the network appliance is further configured to have a high availability (HA) pair connection.

5. A method as recited in claim 1, wherein the network appliance is a special purpose computer for providing a network service.

6. A method as recited in claim 1, further including uncompressing the image.

7. A method as recited in claim 1, wherein the image is received using the Preboot Execution Environment (PXE) protocol.

8. A method as recited in claim 1, wherein the image is received using the Bootstrap Protocol (BOOTP).

9. A method as recited in claim 1, wherein the network appliance provides RADIUS, Apache, LDAP, DHCP, or DNS service.

10. A method as recited in claim 1, further including booting the appliance from the image.

11. A method as recited in claim 1, wherein the image includes operating system code, platform code, or application code.

12. A method of updating software and data on a network appliance having a hard disk, comprising:
    accessing a hard disk having an inactive software partition, an active software partition, an inactive data partition, and an active data partition;
    writing a new version of software to the inactive software partition of the hard disk;
    writing an old version of data to the inactive data partition of the hard disk;
    activating the inactive software partition and the inactive data partition; and
    migrating the old version of data to a new version of data, wherein the new version of software performs the migration.

13. A method as recited in claim 12, further including rebooting the appliance.

14. A method as recited in claim 12, wherein writing the old version includes expressing the old version of data in a markup language format.

15. A method as recited in claim 12, wherein writing the old version includes expressing the old version of data in an XML-based format.

16. A method as recited in claim 12, wherein migrating includes migrating the old version from a markup language format to the new version.

17. A method as recited in claim 12, wherein migrating includes migrating the old version from a markup language format to the new version using a markup language specification of a data migration.

18. A method as recited in claim 12, wherein migrating includes migrating the old version from a markup language format to the new version using an XML-based specification of a data migration.

19. A method as recited in claim 12, further including reverting to the old version of software and/or old version of data.

20. A method as recited in claim 12, further including receiving the new version of software from a download server.

21. A method as recited in claim 12, wherein the new version of software is compressed or encrypted.

22. A method as recited in claim 12, further including migrating information associated with a certificate or a license.

23. A system for installing software on a network appliance having a short term memory and a hard disk, comprising:
    a processor configured to:
        receive an image of the software;
        load the image into a short term memory on the network appliance;
        write the image to a hard disk on the network appliance, wherein the network appliance is associated with a networking protocol, including one or more of: Lightweight Directory Access Protocol (LDAP), Dynamic Host Configuration Protocol (DHCP), Domain Name System (DNS), and Remote Authentication Dial In User Service (RADIUS);
        access a hard disk having an inactive software partition, an active software partition, an inactive data partition, and an active data partition;
        write a new version of software to the inactive software partition of the hard disk;
        write an old version of data to the inactive data partition of the hard disk;

activate the inactive software partition and the inactive data partition; and migrate the old version of data to a new version of data, wherein the new version of software performs the migration; and a memory coupled with the processor, wherein the memory provides the processor with instructions;

wherein the image is received using software that is configured to allow a networked computer without an operating system or a hard disk to be booted remotely over a network.

24. A computer program product for installing software on a network appliance having a short term memory and a hard disk, the computer program product being embodied in a computer readable medium and comprising computer instructions for:

receiving an image of the software;

loading the image into a short term memory on the network appliance; and writing the image to a hard disk on the network appliance, wherein the network appliance is associated with a networking protocol, including one or more of: Lightweight Directory Access Protocol (LDAP), Dynamic Host Configuration Protocol (DHCP), Domain Name System (DNS), and Remote Authentication Dial In User Service (RADIUS);

accessing a hard disk having an inactive software partition, an active software partition, an inactive data partition and an active data partition;

writing a new version of software to the inactive software partition of the hard disk;

writing an old version of data to the inactive data partition of the hard disk;

activating the inactive software partition and the inactive data partition; and migrating the old version of data to a new version of data, wherein the new version of software performs the migration;

wherein the image is received using software that is configured to allow a networked computer without an operating system or a hard disk to be booted remotely over a network.

25. A system for updating software and data on a network appliance having a hard disk, comprising:

a processor configured to:

access a hard disk having an inactive software partition, an active software partition, an inactive data partition, and an active data partition;

write a new version of software to the inactive software partition of the hard disk;

write an old version of data to the inactive data partition of the hard disk;

activate the inactive software partition and the inactive data partition; and migrate the old version of data to a new version of data, wherein the new version of software performs the migration; and a memory coupled with the processor, wherein the memory provides the processor with instructions.

26. A computer program product for updating software and data on a network appliance having a hard disk, the computer program product being embodied in a computer readable medium and comprising computer instructions for:

accessing a hard disk having an inactive software partition, an active software partition, an inactive data partition, and an active data partition;

writing a new version of software to the inactive software partition of the hard disk;

writing an old version of data to the inactive data partition of the hard disk;

activating the inactive software partition and the inactive data partition; and migrating the old version of data to a new version of data, wherein the new version of software performs the migration.

* * * * *